US 7,987,186 B1

(12) United States Patent
Joshi (10) Patent No.: US 7,987,186 B1
(45) Date of Patent: Jul. 26, 2011

(54) METHOD AND SYSTEM FOR WAVELET-BASED REPRESENTATION AND USE OF CARTOGRAPHIC DATA

(75) Inventor: Rajashri Joshi, Schaumburg, IL (US)

(73) Assignee: NAVTEQ North America, LLC, Chicago, IL (US)

(*) Notice: Subject to any disclaimer, the term of this patent is extended or adjusted under 35 U.S.C. 154(b) by 1513 days.

(21) Appl. No.: 09/706,926

(22) Filed: Nov. 6, 2000

(51) Int. Cl.
*G06F 17/30* (2006.01)
(52) U.S. Cl. .................................... 707/736; 707/919
(58) Field of Classification Search .............. 707/100, 707/1–5, 102, 104.1, 200–201, 736, 919, 707/920; 701/200–211; 345/428; 340/995, 340/990; 382/173, 305, 713; 342/450
See application file for complete search history.

(56) References Cited

U.S. PATENT DOCUMENTS

| 4,674,051 A * | 6/1987 | Fischer .................. 701/200 |
| 4,963,865 A * | 10/1990 | Ichikawa et al. ......... 340/995.14 |
| 5,121,326 A * | 6/1992 | Moroto et al. ............... 701/212 |
| 5,541,592 A * | 7/1996 | Shiihara ..................... 340/990 |
| 5,544,052 A * | 8/1996 | Fujita et al. ..................... 702/5 |
| 5,612,700 A * | 3/1997 | Tucker ........................... 342/90 |
| 5,615,114 A * | 3/1997 | Nordin ............................. 702/5 |
| 5,647,058 A * | 7/1997 | Agrawal et al. .................. 707/1 |
| 5,663,929 A * | 9/1997 | Pavone et al. ................. 367/82 |
| 5,673,191 A * | 9/1997 | Chapin et al. ..................... 702/2 |
| 5,737,508 A * | 4/1998 | Feigenbaum ................. 345/442 |
| 5,815,198 A * | 9/1998 | Vachtsevanos et al. ......... 348/88 |
| 5,852,243 A | 12/1998 | Chang et al. ..................... 73/659 |
| 5,893,100 A | 4/1999 | Chui et al. ..................... 707/400 |
| 5,952,957 A * | 9/1999 | Szu ................................ 342/53 |
| 5,966,672 A * | 10/1999 | Knupp ............................. 702/16 |
| 5,974,419 A * | 10/1999 | Ashby ............................ 707/100 |
| 5,978,788 A * | 11/1999 | Castelli et al. .................... 707/2 |
| 5,995,978 A | 11/1999 | Cullen et al. ................. 707/104.1 |
| 6,011,515 A | 1/2000 | Radcliffe et al. .............. 342/453 |
| 6,016,487 A | 1/2000 | Rioux et al. ....................... 707/2 |
| 6,023,291 A * | 2/2000 | Kamel et al. .................. 348/147 |
| 6,065,007 A * | 5/2000 | Muthukrishnan et al. ........ 707/7 |
| 6,084,989 A * | 7/2000 | Eppler ............................ 382/293 |
| 6,107,961 A * | 8/2000 | Takagi ....................... 342/357.13 |

(Continued)

OTHER PUBLICATIONS

Peter Moon and Gerhart de Jager, "An investigation into the Applicability of the Wavelet Transform to Digital Stereo Image Matching", Communications and Signal Processing, 1993, pp. 75-79.*

(Continued)

*Primary Examiner* — James Trujillo
*Assistant Examiner* — Jorge A Casanova
(74) *Attorney, Agent, or Firm* — Jon D. Shutter; Frank J. Kozak; Lisa M. Schoedel (57) ABSTRACT

Cartographic data is represented using wavelet coefficients. Specifically, a cartographic shape point database consisting of shape points and nodes stored on a per geographic feature basis is converted to a cartographic wavelet database consisting of wavelet and scaling coefficients also stored on a per geographic feature basis. The shape of each geographic feature can be reconstructed from the stored wavelet and scaling coefficients for that geographic feature. The wavelet transform organizes the information in a function according to scale, a concept which is related to resolution. The wavelet-based representation facilitates operations such as line simplification (generalization) and zooming. Multi-resolution error metrics are defined using the wavelet representation for assessing the accuracy of sampled cartographic databases with respect to a ground truth database.

8 Claims, 9 Drawing Sheets

U.S. PATENT DOCUMENTS

| | | | |
|---|---|---|---|
| 6,108,609 A * | 8/2000 | Qian et al. ............... 702/66 |
| 6,121,969 A | 9/2000 | Jain et al. ............... 345/850 |
| 6,188,956 B1 * | 2/2001 | Walters ............... 701/200 |
| 6,195,465 B1 * | 2/2001 | Zandi et al. ............... 382/248 |
| 6,208,997 B1 * | 3/2001 | Sigeti et al. ............... 707/104.1 |
| 6,243,483 B1 * | 6/2001 | Petrou et al. ............... 382/103 |
| 6,275,619 B1 * | 8/2001 | Chui ............... 382/248 |
| 6,278,989 B1 * | 8/2001 | Chaudhuri et al. ............... 707/2 |
| 6,282,489 B1 * | 8/2001 | Bellesfield et al. ............... 701/201 |
| 6,308,177 B1 * | 10/2001 | Israni et al. ............... 707/100 |
| 6,335,695 B1 * | 1/2002 | Kawasaki ............... 340/995.14 |
| 6,336,072 B1 * | 1/2002 | Takayama et al. ............... 701/200 |
| 6,366,927 B1 * | 4/2002 | Meek et al. ............... 707/104.1 |
| 6,381,603 B1 * | 4/2002 | Chan et al. ............... 707/10 |
| 6,404,431 B1 * | 6/2002 | Farmer ............... 345/428 |
| 6,414,634 B1 * | 7/2002 | Tekinay ............... 342/453 |
| 6,424,736 B1 | 7/2002 | Meitzler et al. |
| 6,424,933 B1 * | 7/2002 | Agrawala et al. ............... 703/2 |
| 6,516,099 B1 * | 2/2003 | Davison et al. ............... 382/284 |
| 6,766,062 B1 * | 7/2004 | Donoho et al. ............... 382/240 |
| 6,882,997 B1 * | 4/2005 | Zhang et al. ............... 707/6 |
| 7,376,688 B1 * | 5/2008 | von der Embse ............... 708/300 |
| 7,558,310 B1 * | 7/2009 | von der Embse ............... 375/130 |
| 2006/0064233 A1 * | 3/2006 | Adachi et al. ............... 701/117 |

OTHER PUBLICATIONS

W. J. Hong, Multi-resolution Terrain Rendering using Wavelets with Adaptive Meshing, Term Project, Wavelets and Filter Banks—18. 327, MIT; http://exodus.mit.edu/~jesse/papers/abstracts/wavelet-abst.html (Spring 1999).

\* cited by examiner

FIG. 9

METHOD AND SYSTEM FOR WAVELET-BASED REPRESENTATION AND USE OF CARTOGRAPHIC DATA

TECHNICAL FIELD OF THE INVENTION

The present invention relates generally to cartography, and in particular, to the use of wavelet transforms to represent cartographic data.

BACKGROUND OF THE INVENTION

Cartographic databases are used in computer-based systems to represent geographic features on displayable maps. These geographic features may include roads, intersections, and points-of-interest, as well as other features, such as lakes, railroad tracks, buildings, airports, stadiums, parks, mountain ranges, bridges, and so on. To permit these features to be displayed, cartographic databases usually include geographic location information in a format that allows computers to display maps illustrating the size, shape, position, and character of these various geographic features on a display device.

In order to represent these continuous features on a computer, it is necessary utilize some form of discretization. Typically, the features are represented in terms of discrete data points consisting of coordinate pairs (longitude, latitude) or coordinate triples (longitude, latitude, altitude). A point feature such as a point of interest or intersection is then represented as a single data point, while other features such as roads, lake boundaries, and so on are represented as a sequence of data points. The endpoints of the geographic features are commonly referred to as nodes while data points between the nodes are referred to as shape points. Accordingly, nodes and shape points can be used to approximate the true shape of the geographic feature. The shape points and nodes are stored in what is known as a shape point database, which may be part of a larger cartographic database. With this representation scheme, the spacing between shape points is selected such that the error between the data point representation and the actual geographic feature lies within some acceptable bound. In order to achieve a high level of accuracy and detail in the data point representation, it is often necessary to store a large number of data points.

A function available with some computerized map display systems is the ability to zoom. Zooming is the process of magnifying or reducing the scale of a map displayed on the monitor to change the level of detail. Reducing the display scale in a displayed map is referred to as zooming out, while increasing the display scale is referred to as zooming in.

To permit zooming, some cartographic databases include separate collections of location data, each with a different level of detail, which can be used by the map display function. Using these different layers of cartographic data, the map display function can provide or support zooming. However, providing multiple layers of cartographic data requires additional database storage space.

In one type of display system, the different resolution layers of cartographic data are produced by using line generalization algorithms (also referred to as line simplification algorithms). Many different line generalization algorithms are currently being used in cartography, one of which is the Douglas-Peucker algorithm. Generally, line generalization refers to a process of reducing the data points representing a linear geographic feature in a map, while maintaining the overall shape and/or trend of the feature. By applying a line generalization algorithm to a cartographic database having a large number of data points representing a high level of detail, lower resolution databases can be generated. Although known line generalization algorithms are adequate for producing cartographic data collections with different levels of detail, there is an opportunity to improve upon the speed and efficiency at which the algorithms operate.

Accordingly, there is a need for a method and system for representing cartographic data that improves upon known generalization and zooming techniques and provides an ability to reduce the storage requirements of the data without sacrificing feature resolution.

SUMMARY OF THE INVENTION

To address these and other objectives, the present invention comprises a method and system for representing cartographic data using wavelet coefficients. Specifically, a cartographic shape point database consisting of shape points and nodes stored on a per geographic feature basis is converted to a cartographic wavelet database consisting of wavelet and scaling coefficients also stored on a per geographic feature basis. The shape of each geographic feature can be reconstructed from the stored wavelet and scaling coefficients for that geographic feature. The wavelet transform organizes the information in a function according to scale, a concept which is related to resolution. The wavelet-based representation facilitates operations such as line simplification (generalization) and zooming. Multi-resolution error metrics are defined using the wavelet representation for assessing the accuracy of sampled cartographic databases with respect to a ground truth database.

DETAILED DESCRIPTION OF THE PRESENTLY PREFERRED EMBODIMENT(S)

To address the needs for reducing cartographic database sizes and, improving upon known line generalization and zooming techniques, the present invention provides a method and system for generating and using wavelet representations of cartographic data.

The wavelet transform maps a square integrable function to the scale-space domain. Specifically, the wavelet transform of a signal provides information about the resolution content of a function as well as information about the location of each resolution component. This property of wavelets is called time-frequency localization. Wavelet transforms are widely used for the analysis of non-stationary signals. Their unique properties make them a valuable tool in a wide variety of areas such as numerical analysis, edge detection in images, image compression, and analysis of fractal signals, to name just a few.

A wavelet representation of cartographic data can provide an accurate representation of the data, and a consistent and intuitive method for generalization for the purpose of map display at different zoom levels. Furthermore, the wavelet transform can be easily extended to two or more dimensions.

Display operations like generalization and zooming can be accomplished much more intuitively and easily using the wavelet representation, because generalization will simply involve dropping wavelet coefficients at certain scales. With a wavelet representation, the wavelet coefficients for each geographic feature can be stored for the highest level of resolution. To produce displays of lower resolution, higher resolution wavelet coefficients are not used.

Wavelets and Wavelet Transforms

Wavelets are families of functions of the following form $$\psi_{ab}(x) = |a|^{-1/2} \psi\left(\frac{x-b}{a}\right) \quad (1)$$

where a and b are respectively called the dilation (scaling) and translation parameters. As a is increased, the function $\psi_{ab}(x)$ becomes more spread out or dilated, and as b is increased or decreased $\psi_{ab}(x)$ is shifted or translated by b/a. Thus, wavelets are constructed by dilating and translating a single prototype function $\psi(x)$ called a mother wavelet. The dilation and translation parameter pairs (a,b) can range over a continuous or discrete subset of $\Re^+ \times \Re$.

If the parameters a and b are restricted such that $a=2^{-m}$ and b=mi, where m and i are integers, then the resulting wavelets are called dyadic wavelets and are parameterized by the integers m and i. Dyadic wavelets are expressed as:

$$\psi_{mi}(x) = 2^{m/2} \psi(2^m x - i) \quad (2)$$

In this case, negative values of m correspond to dilating $\psi(x)$ and positive values of m correspond to contracting $\psi(x)$.

Figure 1:
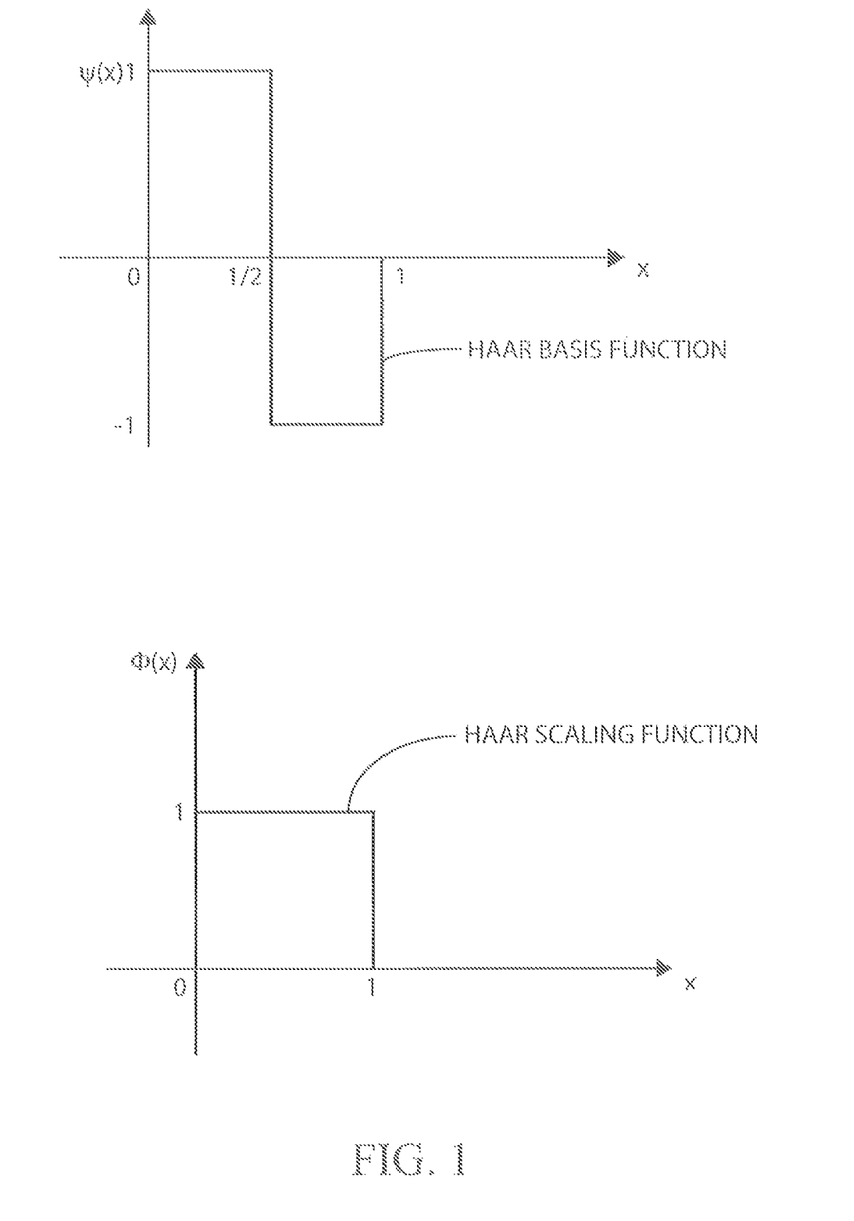
FIG. 1 is a Cartesian graph showing a Haar basis function and scaling function.

Although the present invention is not so limited, the embodiments described herein can utilize dyadic wavelets. It is possible to select a dyadic mother wavelet $\psi(x)$ such that the set of functions $\{\psi_{mi}\} \forall (m,i) \in Z \times Z$ constitutes an orthonormal basis for $L^2(\Re)$, where $L^2(\Re)$ represents the space of square-integrable functions defined on the real line. The simplest choice of $\psi(x)$ which yields an orthonormal basis of $L^2(\Re)$ is the Haar mother wavelet, shown in the FIG. 1.

Other orthogonal bases include the Daubechies family of bases. These functions are indexed by an integer N; the regularity (which loosely means smoothness) of these bases increases with N.

Turning now to wavelet transforms, which rely on wavelets such as those discussed above, there are many different types of wavelet transforms. The wavelet representation of geographic features yields accurate results, and can also be made more accurate by using smoother basis functions, and using more coefficients in certain regions of each geographic feature.

The different types of wavelet transforms are distinguished from one another by the types of wavelets used in their definitions. In the methods and systems disclosed herein, orthonormal wavelet transforms are preferably used; however, nonorthonormal wavelets could also be used for the purpose of representing cartographic data. The semi-discrete orthonormal wavelet transform of a square integrable computable function $f(x)$ is defined, using dyadic wavelets, b the analysis and synthesis equations given below:

Analysis Equation:
$$F(m, i) = \int_{-\infty}^{\infty} f(x) \psi_{mi}(x) dx \quad (3)$$

Synthesis Equation:
$$f(x) = \sum_{m=-\infty}^{\infty} \sum_{i=-\infty}^{\infty} f(m, i) \psi_{mi}(x) \quad (4)$$

The values F(m,i) are called the wavelet coefficients. The functions $\psi_{mi}(x) = 2^{m/2} \psi(2^m x - i)$ are the wavelet basis functions. The set of basis functions $\{\psi_{mi}(x)\}$ is thus constructed by scaling and translating the mother wavelet function $\psi(x)$. The integer m is the dilation or scaling parameter and the integer i is a translation parameter. Negative values of m correspond to dilating $\psi(x)$ and positive values of m correspond to contracting $\psi(x)$.

As can be seen from the analysis equation above, the wavelet coefficients F(m,i) are obtained via an inner product computation of the square integrable function $f(x)$ and the corresponding wavelet basis function, i.e., $\langle f(x), \psi_{mi}(x) \rangle$. The set of wavelet coefficients $\{F(m,i)\}$ can be indexed by both scale or resolution m and location or translation i.

The square integrable function $f(x)$ can be reconstructed using the synthesis equation, which is sometimes called a wavelet series expansion. The wavelet representation of a square integrable function is thus a weighted sum of wavelet basis functions, the weights being the wavelet coefficients.

The wavelet transform is considered to be semi-discrete because it takes the continuous function $f(x)$ and transforms it into a set of coefficients indexed by integral values. This transform therefore accomplishes the goal of representing the continuous function $f(x)$ in terms of a set of discrete values $\{F(m,i)\}$, which can be stored in memory on a computer.

The limits on the translation index i in the inner summation of Equation (4) are determined by the support of the square integrable function $f(x)$. The limits on i are finite if $f(x)$ has compact support. The limits on the dilation index m in the outer summation of Equation (4) are infinite. In practice, however, the limits of m must be truncated both above and below to predetermined values to yield a reasonable approximation of $f(x)$. This is done by collecting all terms in the expansion for $m \in (-\infty, M')$ into a single term $\Lambda_{M'}(x)$, which represents the approximation of the function at the highest resolution level, layer 0. The finer details of the function are expressed in terms of a wavelet series expansion as indicated in Equation (5).

$$f(x) \approx \Lambda_{M'}(x) + \sum_{m=M'}^{M} \sum_{i=-\infty}^{\infty} F(m, i) \psi_{mi}(x) \quad (5)$$

It is often convenient to include only nonnegative scales in the approximation, i.e., truncate all expansion terms below m=0 and above some arbitrary scale M that yields an approximation to $f(x)$ that is acceptable for the given application. Furthermore, $\Lambda_{M'}(x)$ is expressed in terms of dilations and translations of the function $\psi(x)$, which is called the scaling function associated with the wavelet function $\phi(x)$. This results in the following equation:

$$f(x) \approx \sum_{i=-\infty}^{\infty} F'(i)\phi_{M'i}(x) + \sum_{m=M'}^{M} \sum_{i=-\infty}^{\infty} F(m,i)\psi_{mi}(x) \quad (6)$$

where the quantities the F'(i), are known as the scaling coefficients, and are given by $$F'(i) = \int_{-\infty}^{\infty} f(x)\phi_{M'i}(x)dx \quad (7)$$

One advantage of using the wavelet transform for representing cartographic data is that the transform organizes the information in the data into components at various resolutions or scales. This is particularly useful for line generalization that supports map display features, such as zooming. This can be explained as follows. For negative values of m, the corresponding wavelet basis functions are dilated, i.e., they have a larger width of support than the mother wavelet. As a result, the wavelet coefficients indicated by negative values of m will correspond to coarse scale or low-resolution information contained in the cartographic data. This corresponds roughly to zooming out and observing the square integrable function $f(x)$ from a distance. The more negative the value of m, the more the displayed feature is effectively zoomed out.

On the other hand, for positive values of m, the resulting wavelet basis functions are contracted with respect to the mother wavelet, i.e., their width of support is smaller than that of the mother wavelet. As a result, the wavelet coefficients indicated by positive values of m correspond to fine scale or high resolution information contained in the cartographic data represented by the square integrable function $f(x)$. This corresponds roughly to zooming in and observing the square integrable function $f(x)$ from close up.

Figure 2:
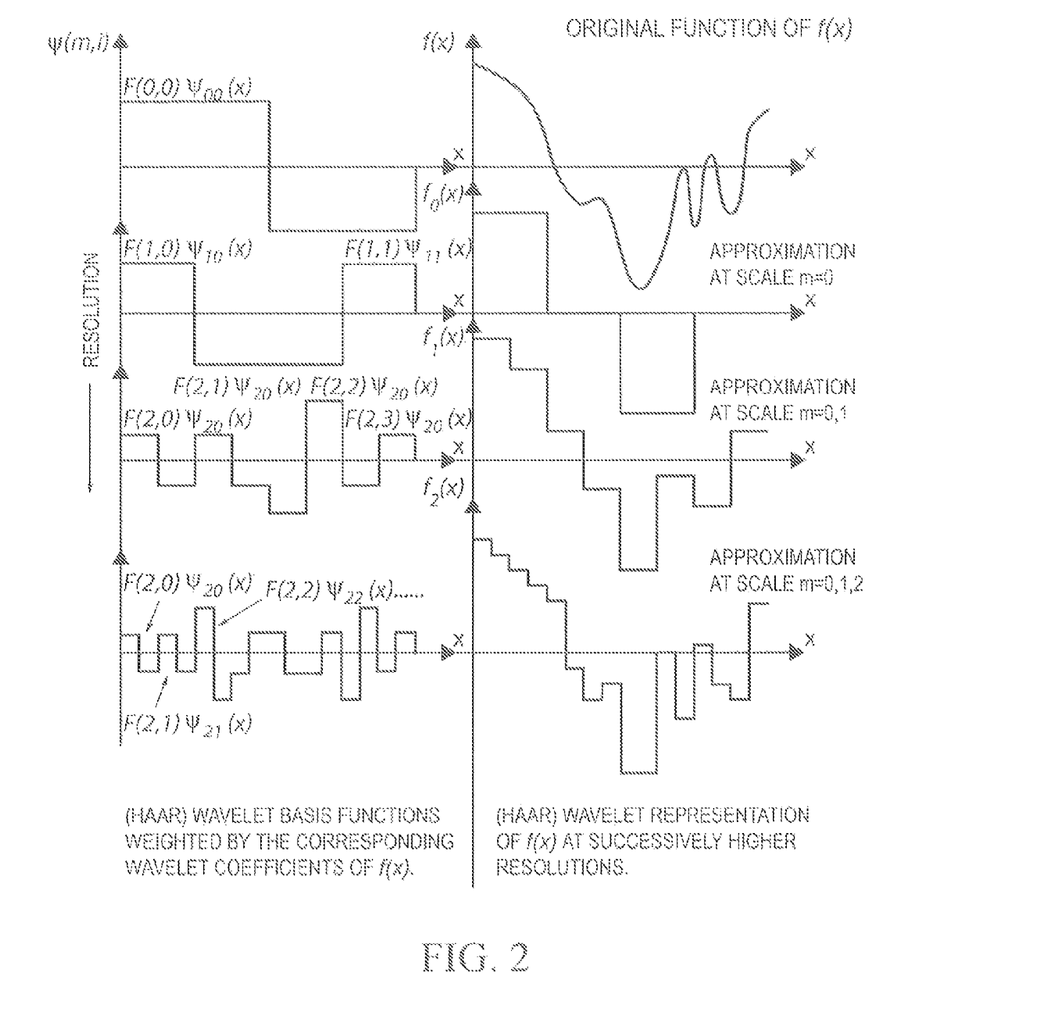
FIG. 2 is series of Cartesian graphs illustrating an exemplary square integrable function $f(x)$ and its approximation at successively higher resolutions using wavelet basis functions of successively higher resolutions.

This zooming aspect of wavelet transforms is illustrated in FIG. 2 using the Haar basis function. The column of graphs on the right-hand side of FIG. 2 shows an exemplary square integrable function $f(x)$ and its approximation at successively higher resolutions using wavelet basis functions of successively higher resolutions. The corresponding wavelet basis functions for the successive levels of resolution are illustrated in the left-hand column of graphs.

From the sequence of graphs, it is apparent that as each successive scale of wavelet coefficients is added to the approximation, the approximation becomes more accurate. The Haar basis function is used here only for illustrative purposes. There exist other wavelet bases that can yield accurate representation of continuous functions.

Figure 3:
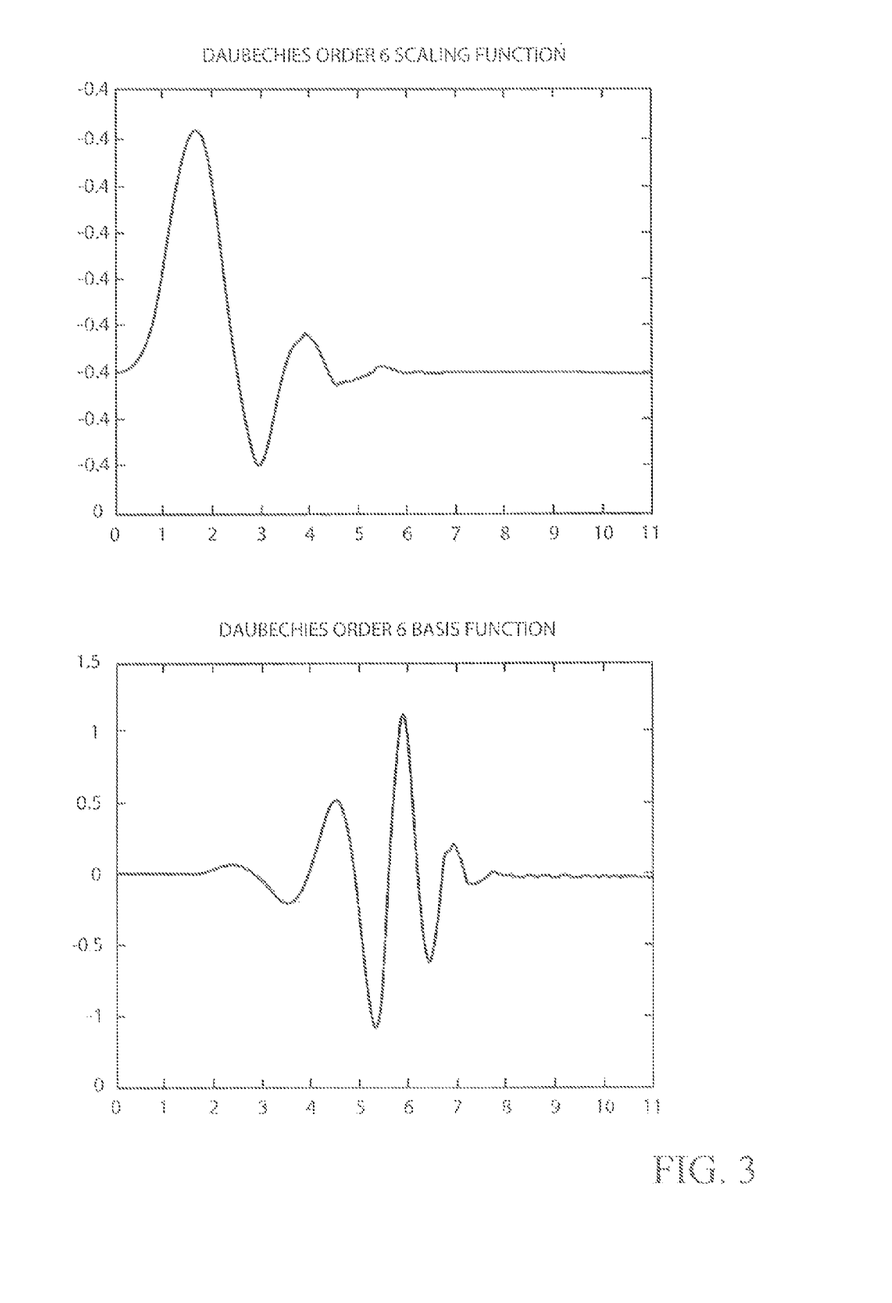
FIG. 3 shows a pair of graphs illustrating an exemplary wavelet basis function and the corresponding wavelet scaling function.

FIG. 3 shows a pair of graphs illustrating an exemplary wavelet basis function and an exemplary wavelet scaling function. The wavelet basis function shown in FIG. 3 is a Daubechies sixth order basis function. This is an orthonormal basis function that has compact support and has a high enough order of continuity for accurately representing cartographic data for some applications. The wavelet scaling function shown in FIG. 3 is associated with the Daubechies sixth order basis function. The Haar basis function is a degenerate case of Daubechies basis function. Daubechies bases do not have closed form expressions, but since all wavelet basis functions are derived from a single prototype function, it is sufficient to compute the values of the mother wavelet once and then store them in a look-up table. There also exist other (non-compactly supported) orthonormal wavelet bases, such as the Battle-Lemarie basis function, which can also be used in other embodiments of the invention.

Other wavelet bases include compactly supported non-orthogonal wavelet bases, such as the B-wavelets which are constructed from splines. The Haar basis function is a degree zero B-spline. These may be of special interest in cartographic applications; however, since they are not orthogonal, the wavelet coefficients will not be quite as easy to compute, as compared to the orthonormal case. However, this is generally not an issue since the wavelet coefficients for a cartographic database need only be computed once, at the time the wavelet database is generated.

Parameterization of Cartographic Data

Each geographic feature can, in general, be represented as a continuous function in space and can be represented in implicit form as $f(x,y,z)=0$, where x, y and z represent longitude, latitude and altitude, respectively. In order to apply the wavelet transform, it is convenient to express each geographic feature in parametric form as a group $\mathbb{P}(t)$ of polynomial functions of an independent parameter t as follows:

$$\mathbb{P}(t)=[x(t)y(t)z(t)] \quad (8)$$

The parameterization scheme can be chosen in such a way that each of the functions x(t), y(t) and z(t) are each single valued. The wavelet transform can then be applied to each of the functions x(t), y(t) and z(t). This yields $\mathbb{P}(m,i)=[X(m,i) Y(m,i) Z(m,i)]$ where X(m,i,), Y(m,i) and Z(m,i) are the wavelet coefficients of x(t), y(t) and z(t) respectively, and $\mathbb{P}'(i)=[X'(i) Y'(i) Z'(i)]$ where X'(i), Y'(i) and Z'(i) are the scaling coefficients of x(t), y(t) and z(t), respectively.

System Architecture

Figure 4:
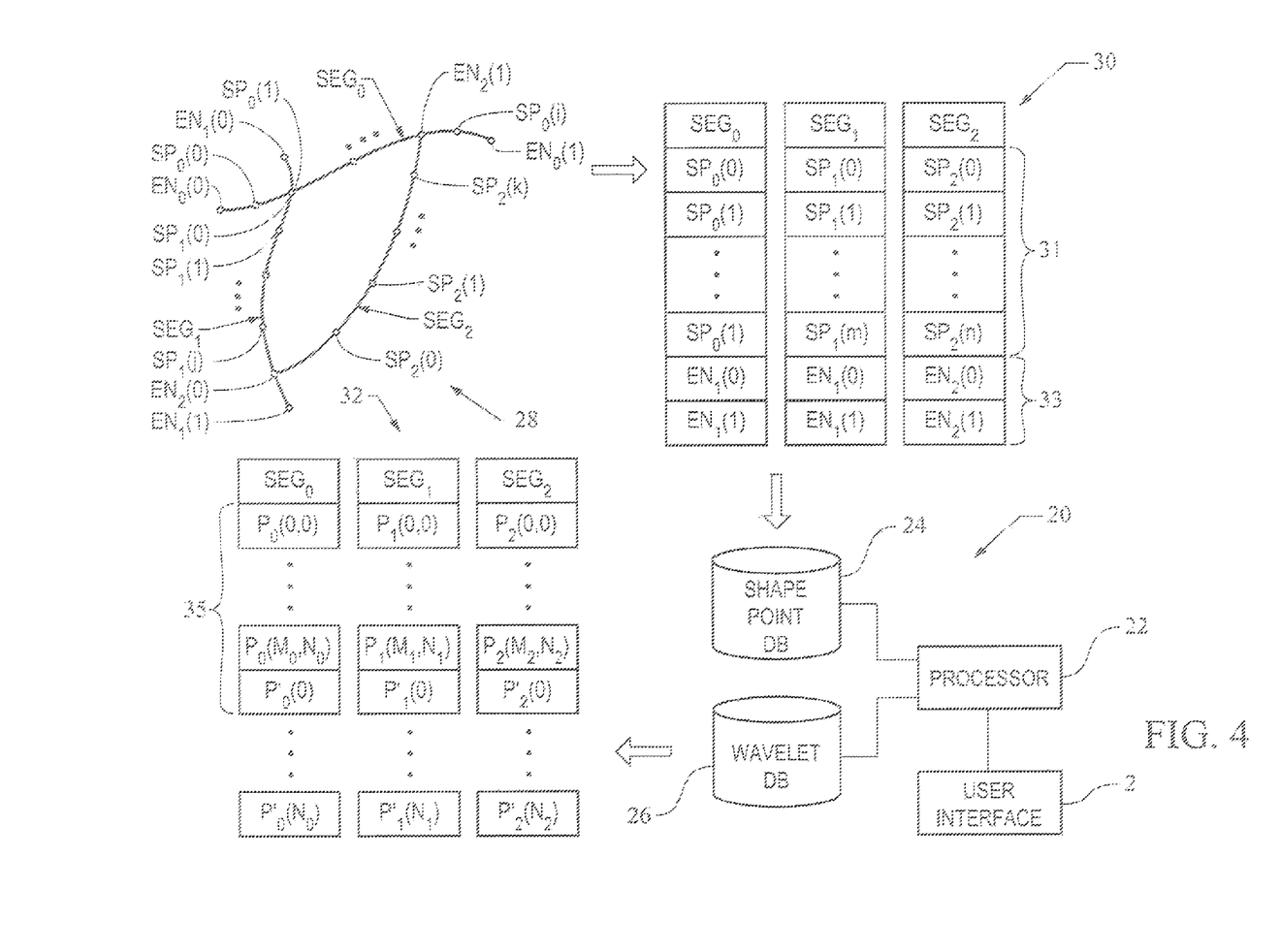
FIG. 4 is a block diagram illustrating an exemplary system for converting shape point data of a cartographic database into a database of wavelet and scaling coefficients in accordance with an embodiment of the present invention.

FIG. 4 illustrates an exemplary system 20 for converting a shape point database into a database of wavelet and scaling coefficients in accordance with an embodiment of the present invention. The shape point database itself may be part of a larger cartographic database, which may include other kinds of databases used for functions such as route calculation, maneuver generation, and other navigational functions. The system 20 includes a processor 22 in communication with a shape point database (DB) 24 and a wavelet database 26. A user interface 21 permits database developers to configure conversion parameters used by the processor 22 such as the desired highest level of resolution in the wavelet representation.

The shape point database 24 stores a plurality of shape points and nodes representing one or more geographic features that can be displayed by a computer-based system, such as a navigation system, as part of a digital map. Shape points and nodes represent geographic locations within a map. In the embodiments disclosed herein, the shape points and nodes can consist of coordinate triples (longitude, latitude, altitude) or coordinate pairs (longitude, latitude), which represents specific locations along geographic features. Nodes are special cases of shape points, representing, for example, intersections between road segments and end points of geographic features.

Data stored in the shape point database 24 can be organized on a per geographic feature basis, i.e., each geographic feature is represented as sequence of nodes and shape points. Although the database 24 can store a number of geographic feature entities 30, three entities $SEG_0$, $SEG_1$, $SEG_2$ are shown for illustration purposes. A pair of nodes and zero or more shape point entries 31 can be associated with each entity. For entities representing straight or substantially straight geographic features, the nodes 33 are sufficient to accurately represent the feature; and therefore, for straight geographic features, the nodes alone can be stored without shape points.

In the example shown, a first geographic feature $SEG_0$ is represented by shape points $SP_0(0)$-$SP_0(i)$, where i is an integer, and nodes $EN_0(0)$-$EN_0(1)$; a second feature $SEG_1$ is represented by shape points $SP_1(0)$-$SP_1(j)$, where j is an integer, and nodes $EN_1(0)$-$EN_1(1)$; and a third feature $SEG_2$ is represented by shape points $SP_2(1)$-$SP_2(k)$, where k is an integer, and nodes $EN_2(0)$-$EN_2(1)$.

Figure 5:
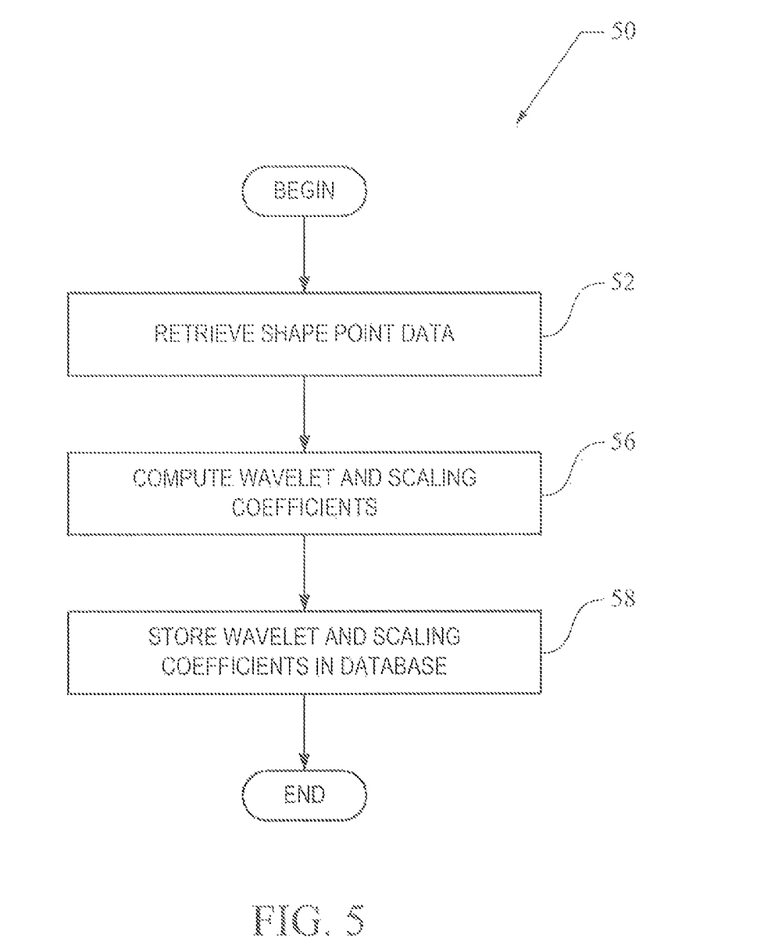
FIG. 5 is a flow chart illustrating a method of operating the processor shown in FIG. 4.

The processor 22 can be any computing device for performing the steps shown in the flow chart 50 of FIG. 5, including a conventional personal computer (PC) executing a software program. In such an embodiment, the software program can be stored on a computer-usable medium for configuring the processor 22 to perform the method of FIG. 5 as disclosed herein. The computer-usable medium can be any article of manufacture for storing computer programs, such as a CD ROM, hard drive, DVD, diskette, solid-state memory such as a RAM, ROM, or EEPROM, or the like. Alternatively, the processor 22 can be a custom hardware device, such as one or more application specific integrated circuits (ASIC) designed to perform according to the method shown in FIG. 5.

As will be discussed in greater detail below, the processor 22 processes data stored in the shape point database 24 to convert it into a plurality of wavelet coefficients that are stored in the wavelet database 26. The wavelet representation can provide a more efficient representation of map data that facilitates line generalization and map display features, such as zooming.

Generally, for each geographic feature entity in the shape point database, the processor 22 generates a corresponding set of wavelet and scaling coefficients that are stored in the wavelet database 26. The geographic features can be reconstructed using the wavelet synthesis equation to draw the features on a map display. Further, the wavelet and scaling coefficients for each entity can be indexed by layer or resolution level.

In the example shown, the first geographic feature $SEG_0$ is represented by wavelet coefficients $\mathbb{P}_0(0,0), \ldots, \mathbb{P}_0(M_0, N_0)$, and scaling coefficients $\mathbb{P}_0'(0), \ldots, \mathbb{P}_0'(N_0)$, where $M_0$ and $N_0$ are integers; the second geographic feature $SEG_1$ is represented by wavelet coefficients $\mathbb{P}_1(0,0), \ldots, \mathbb{P}_1(M_1, N_1)$ and scaling coefficients $\mathbb{P}_1'(0), \ldots, \mathbb{P}_1'(N_1)$, where $M_1$ and $N_1$ are integers; and the third geographic feature $SEG_2$ is represented by wavelet and scaling coefficients $\mathbb{P}_2'(0), \ldots, \mathbb{P}_2'(N_2)$, where $M_2$ and $N_2$ are integers. In the above, $$\mathbb{P}_k(m,i) = [X_k(m,i)\ Y_k(m,i)\ Z_k(m,i)] \text{ and } \mathbb{P}_k'(i) = [X_k'(i)\ Y_k'(i)\ Z_k'(i)]. \tag{9}$$

The shape point and wavelet databases 24 and 26, as well as all other databases disclosed herein, can be stored using any suitable computer-usable storage media, such as one or more CD ROMs, hard drives, DVDs, diskettes, solid-state memories such as RAMs, ROMs, or EEPROMs, or the like.

FIG. 5 shows a flow chart 50 illustrating a method of operating the processor 22 shown in FIG. 4. In step 52, the processor 22 receives shape points and/or nodes representing one or more geographic features from the shape point database 24. The processor can include a memory (not shown) for buffering the shape points.

Next in step 56, the wavelet coefficients are computed for each parameterized geographic feature $\mathbb{P}(t)=[x(t)\ y(t)\ z(t)]$. This can be done in one of two possible ways. If $\mathbb{P}(t)$ is known at all points, or if the data points of $\mathbb{P}(t)$ are spaced sufficiently closely, then the wavelet and scaling coefficients are computed for the given data points by using the following discretized versions of Equations (3) and (7):

$$F(m, i) \approx \sum_{k=-\infty}^{\infty} f(k\Delta x)\psi_{mi}(k\Delta x)\Delta x \tag{10}$$

$$F'(i) \approx \sum_{k=-\infty}^{\infty} f(k\Delta x)\phi_{mi}(k\Delta x)\Delta x \tag{11}$$

If the data points of $\mathbb{P}(t)$ are not spaced sufficiently closely, then the wavelet coefficients can be computed by using a least squares fitting technique.

Many different types of wavelet transforms are available and the present invention is not limited to any particular type. However, a preferable form of the wavelet transform employed by the method shown in FIG. 5 was described above in connection with Equations (3)-(4).

An advantage of the wavelet representation of a function is that the wavelet and scaling coefficient set often contains a large number of small or zero values, which can simply be dropped. This allows cartographic data being represented by wavelets to be compressed, reducing the amount of database space necessary to store the wavelet coefficients, without significantly degrading the accuracy of the representation.

In step 58, the wavelet coefficients and scaling coefficients for the geographic features are stored in the wavelet database 26.

Figure 6:
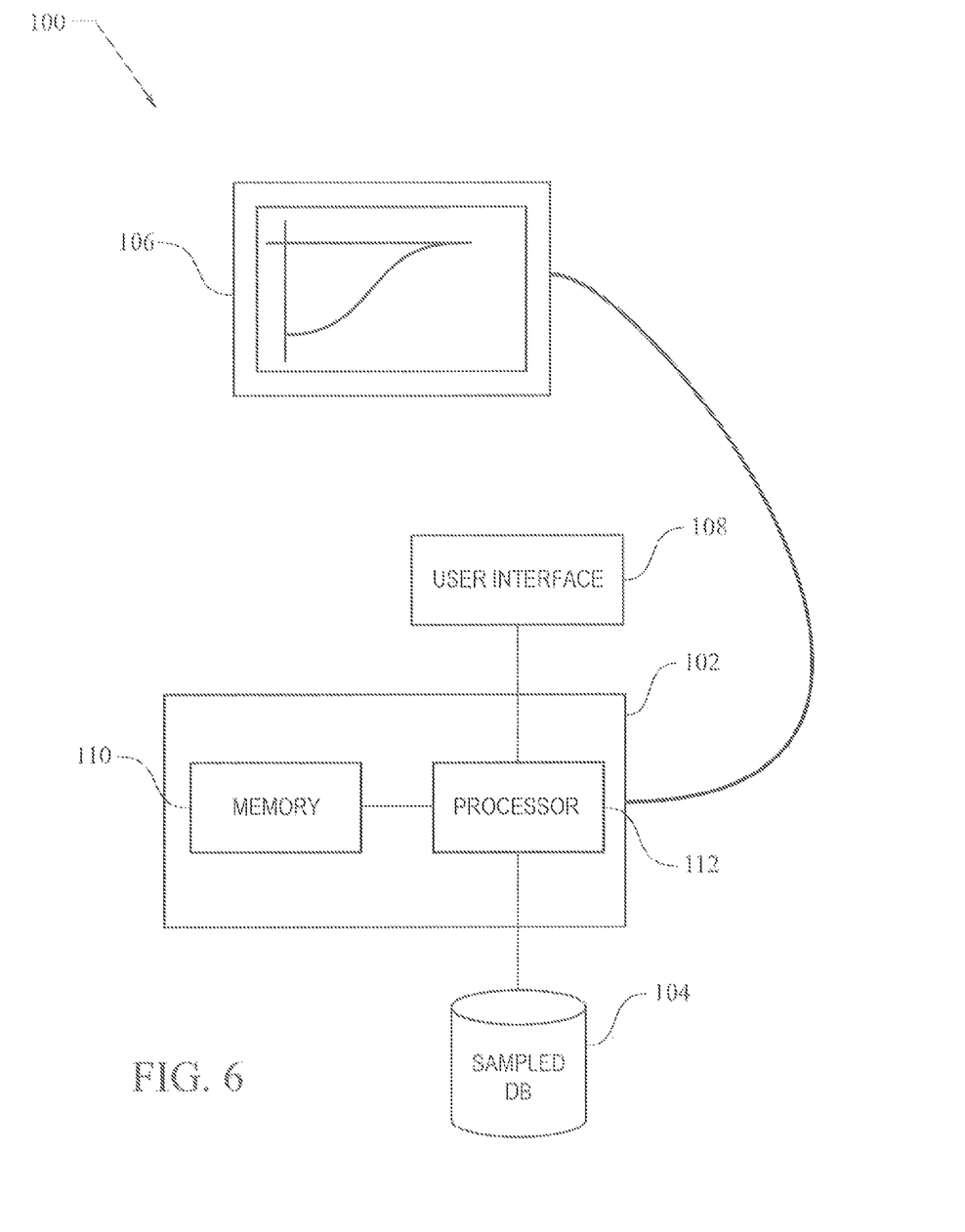
FIG. 6 is a block diagram illustrating a computer-based system capable of displaying cartographic data represented using wavelets in accordance with a further embodiment of the present invention.

FIG. 6 illustrates a computer-based system 100 capable of displaying cartographic data represented using wavelets in accordance with another embodiment of the present invention. The system 100 includes a computer 102, a wavelet database (DB) 104, a user interface 108, and an output display device 106.

The computer 102 can be any computing device, including a conventional PC or other microprocessor-based device having a processor 112 and a memory 110. The processor 112 can execute a computer software program stored in the memory 110. The software program can direct the processor 112 to perform the steps shown in the flow chart diagram 120 of FIG. 7.

The user interface 108 can be a software-generated graphical interface included in a commercially-available PC operating system, configured to direct the processor 112 to receive and process user selections, such as the desired level of resolution in the displayed map.

The wavelet database 104 includes the wavelet coefficients and scaling coefficients and basis function data.

The computer-based system 100 of FIG. 6 can be part of a navigation system included with on-road vehicles, such as automobiles, trucks, buses, and so on, as well as advanced driver assistance systems (ADAS) provided in on-road vehicles.

Figure 7:
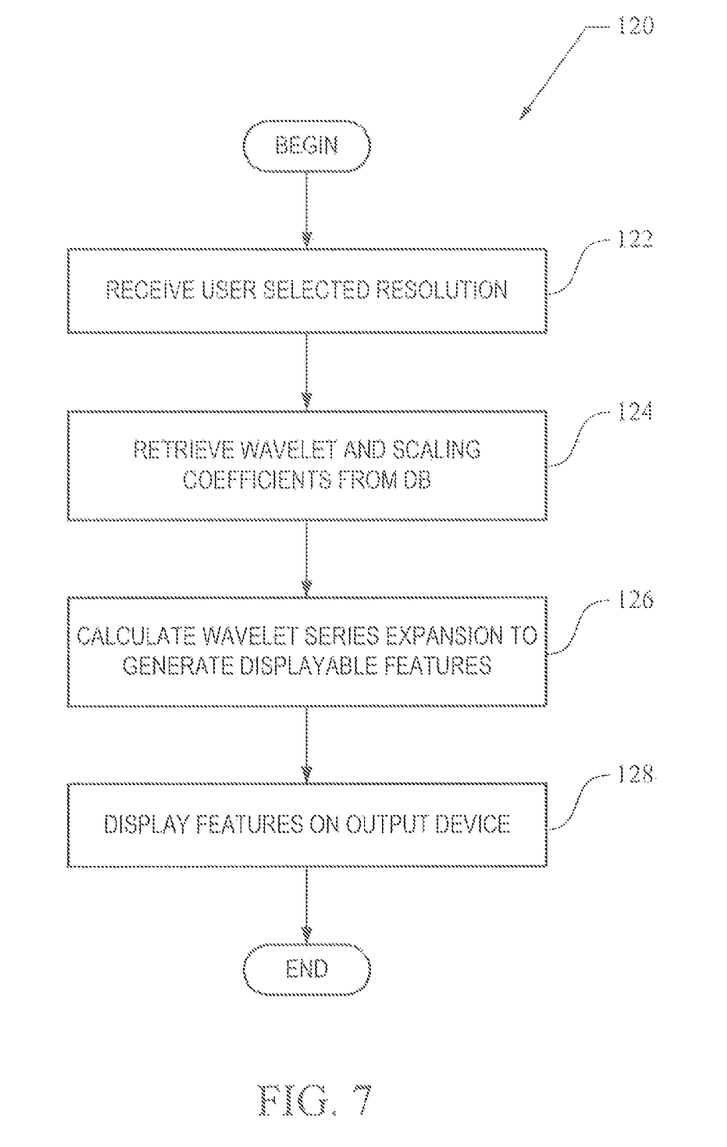
FIG. 7 is a flow chart illustrating a method of operating the computer-based system shown in FIG. 6.

The flow chart diagram 120 in FIG. 7 illustrates the operation of the computer-based system 100 shown in FIG. 6. In step 122, the computer 102 receives a user selected resolution level from the user interface 108. The resolution level determines the scale at which the cartographic data is displayed, and may be embodied as a zooming feature of the system 100. The zooming feature is described in further detail below.

Next, in step 124, the processor 112 retrieves wavelet and scaling coefficients corresponding to the desired geographic features from the wavelet database 104. The wavelet coefficients in the database 104 can be indexed by scale, facilitating retrieval of the coefficients corresponding to the user selected resolution level, if desired. In addition to retrieving the wavelet coefficients, the processor can also retrieve from the database 54 the precomputed wavelet basis and scaling function values. The parameterized functions $P(t)=[x(t)\ y(t)\ z(t)]$, which represent geographic features, such as a road segments, rivers, or the like, for cartographical applications, can be reconstructed from the wavelet coefficients and a look-up table storing the precomputed wavelet basis and scaling function values.

In step 126, the processor 112 reconstructs the functions that represent geographic features. Through a conventional display interface card (not shown), the processor 112 then passes the reconstructed functions to the output display device 106, which then displays the function representing the geographic feature to the user (step 128). The wavelet zooming feature of the system 100 is explained as follows. Starting with the highest resolution wavelet series approximation of the function $P(t)=[x(t)\ y(t)\ z(t)]$, zooming out, or reducing resolution, can be accomplished by successively removing the finest scale wavelet coefficients from the wavelet expansion. As an example, suppose that the cartographic display data is organized into five layers, labeled layer 0 through layer 4, with layer 0 representing the lowest level of resolution and layer 4 representing the highest level of resolution. Let $P_i(t)$ denote the function representing the approximation of the function $P(t)$ resolution i. Then, $P_4(t)$ is obtained by including wavelet coefficients for scales $0 \leq m \leq 4$, i.e., $f_4(x)$ is a summation of the form of Equation (5), with $M=4$, as shown below in Equation (12).

Layer 3 data can be represented by dropping all wavelet coefficients corresponding to the finest scale used in the initial approximation $P_4(t)$, resulting in the wavelet series shown in Equation (13); layer 2 data can be represented by dropping all wavelet coefficients corresponding to the finest scale in the layer 3 representation, resulting in the wavelet series of Equation (14); and so on. As scales are dropped from the wavelet approximation, the resolution of the approximation becomes progressively lower, i.e., the wavelet representation is effectively zooming out. Equations (12)-(16) show the wavelet synthesis equations for each layer.

Layer 0: $$p_0(t) \approx \sum_{i=-\infty}^{\infty} P'(i)\psi_{0i}(x) + \sum_{m=0}^{4}\sum_{i=-\infty}^{\infty} P(m,i)\phi_{mi}(t) \quad (12)$$

Layer 1: $$p_1(t) \approx \sum_{i=-\infty}^{\infty} P'(i)\psi_{0i}(x) + \sum_{m=0}^{3}\sum_{i=-\infty}^{\infty} P(m,i)\phi_{mi}(t) \quad (13)$$

Layer 2: $$p_2(t) \approx \sum_{i=-\infty}^{\infty} P'(i)\psi_{0i}(x) + \sum_{m=0}^{2}\sum_{i=-\infty}^{\infty} P(m,i)\phi_{mi}(t) \quad (14)$$

Layer 3: $$p_3(t) \approx \sum_{i=-\infty}^{\infty} P'(i)\psi_{0i}(x) + \sum_{m=0}^{1}\sum_{i=-\infty}^{\infty} P(m,i)\phi_{mi}(t) \quad (15)$$

Layer 4: $$p_4(t) \approx \sum_{i=-\infty}^{\infty} P'(i)\psi_{0i}(x) + \sum_{i=-\infty}^{\infty} P(0,i)\phi_{0i}(t) \quad (16)$$

Multi-resolution Error Metrics for Cartographic Databases

Figure 8:
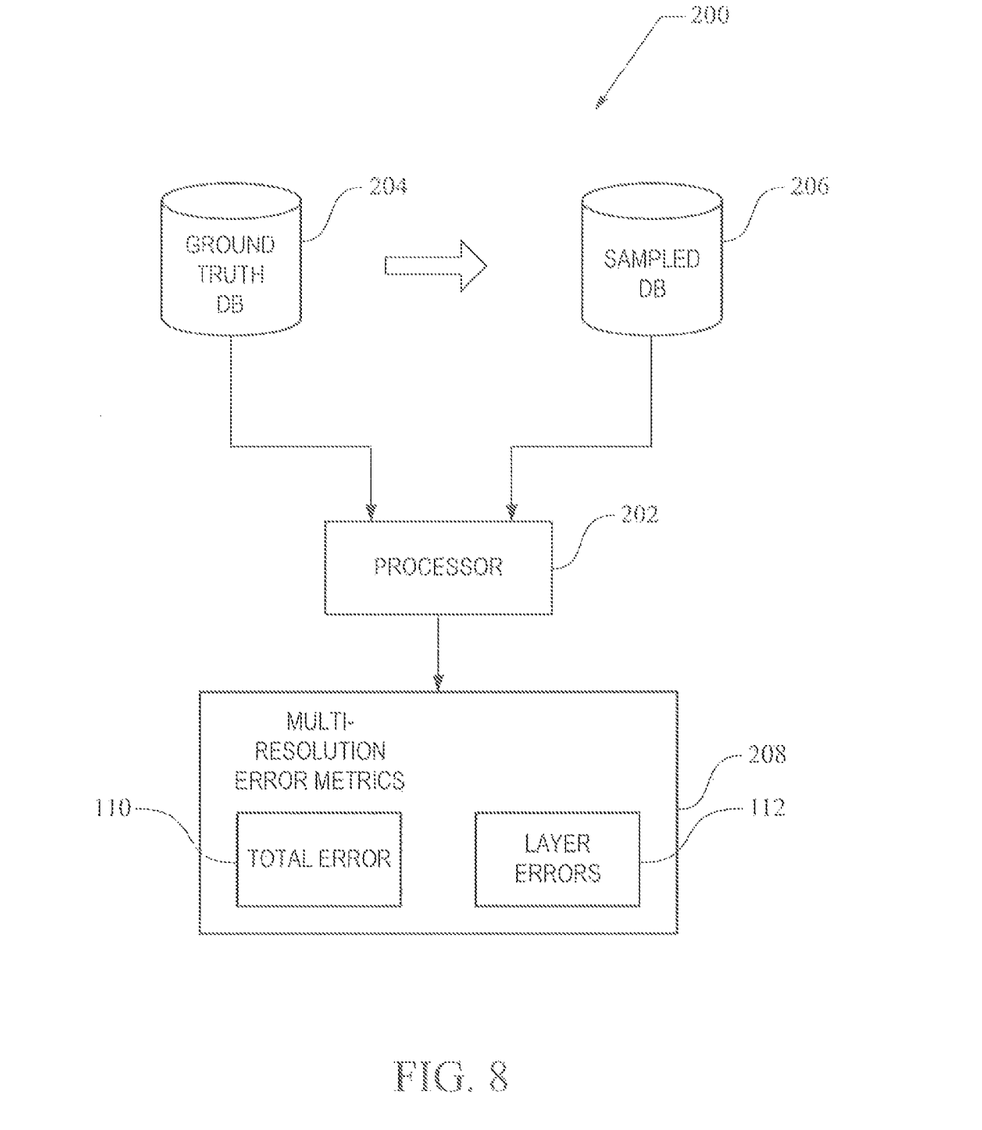
FIG. 8 is a block diagram illustrating a system for computing multi-resolution error metrics in accordance with another embodiment of the present invention.

In addition to generating displayable maps, the wavelet coefficients of the cartographic data can be used to define a multi-resolution error metric for measuring database accuracy. FIG. 8 illustrates a system 200 for generating a multi-resolution error metric in accordance with yet another embodiment of the present invention. The database which is being assessed for accuracy is commonly referred to as a sampled database 206. The system also includes another database called the ground truth database (DB) 204 and a processor 202. Both of these databases are shape point databases, i.e., both the sampled database 206 and the ground truth database 204 contain plural shape points and nodes representing the same geographic features, such as roads, and so forth; however, the shape points are more densely represented in the ground truth database 204 to give a highly accurate representation of the geographic features. The ground truth database is constructed by using more accurate sources (which may include preexisting maps or imagery, as well as sensor measurements) than those sources used for constructing the sampled database.

The processor 202 can be any computing device, including a conventional PC or other microprocessor-based device. The processor 202 can execute a computer software program for performing the steps shown in the flow chart diagram 230 of FIG. 9.

The flow chart diagram 230 illustrates a method of operating the processor 202 to generate one or more multi-resolution database error metrics. In step 232, the wavelet and scaling coefficients of the geographic features represented in the ground truth database are computed and stored in the ground truth wavelet database 204. This can be done by generating the coefficients from the shape points of the ground truth database (GD) on a per segment basis as described above in connection with FIGS. 1-5.

The wavelet and scaling coefficients of the geographic features represented in the sampled database are then calculated and stored in the sampled wavelet database using the method as described above in connection with FIGS. 1-5 (step 236).

The total error of the sampled database 206 with respect to the ground truth database 204 is designated $e(t)=[e^x(t)\ e^y(t)\ e^z(t)]$, where $e^x(t)$, $e^y(t)$ and $e^z(t)$ are the components of error corresponding to longitude, latitude and altitude, respectively.

Figure 9:
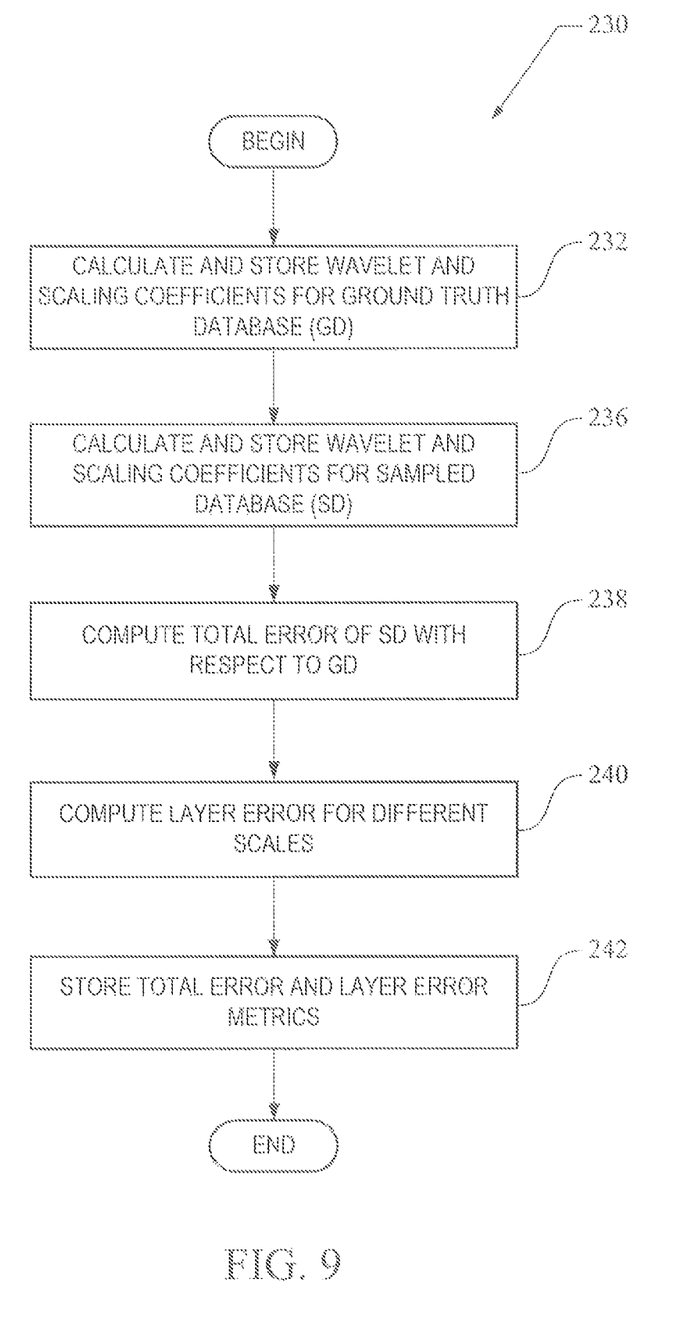
FIG. 9 is a flow chart illustrating a method of operating the processor shown in FIG. 8.

In step 238, the total error $e(t)$ is computed as follows:

$$e(t) = \sum_{i=-\infty}^{\infty}[P'_{SD}(i) - P'_{GD}(i)]\phi_{M'i}(t) + \quad (17)$$

$$\sum_{m=M'}^{M}\sum_{i=-\infty}^{\infty}[P_{SD}(m,i) - P_{GD}(m,i)]\psi_{mi}(t) = e_{M'}(t) + \sum_{m=M'}^{\infty}e_m(t)$$

where $$e_{M't} = \sum_{i=-\infty}^{\infty}[P'_{SD}(i) - P'_{GD}(i)]\phi_{M'i}(t) + \quad (18)$$

$$\sum_{i=-\infty}^{\infty}[P_{SD}(M',i) - P_{GD}(M',i)]\psi_{M'i}(t)$$

$$e_m(t) = \sum_{i=-\infty}^{\infty}[P_{SD}(m,i) - P_{GD}(m,i)]\psi_{mi}(t), \text{ for } M' < m \leq M$$

and $\mathbf{P}_{GD}$ and $\mathbf{P}_{SD}$ are the wavelet coefficients of the ground truth database 204 and the sampled database 206, respectively and $\mathbf{P'}_{GD}$ and $\mathbf{P'}^{SD}$ are the scaling coefficients of the ground truth database 204 and the sampled database 206, respectively. The set of values $\{\mathbf{e}_m(t)=[e_m^x(t)\ e_m^y(t)\ e_m^z(t)]\}$ represent the layer error metric values.

In step 240, a layer error metric value can be generated for a selected resolution layer of the sampled database 206. The total error determined by Equation (14) is thus decomposed into error components at different scales, represented by the integer m. Thus two types of error can be obtained for each geographic feature represented in the sampled database: the layer error $\mathbf{e}_m(t)$ at a particular scale m, as well as the total error $\mathbf{e}(t)$, which is the sum of the errors at all scales. Note that $\mathbf{e}_m(t)$ and $\mathbf{e}(t)$ are vectors, with longitude, latitude and altitude components. But we can compute $e_m^{combined}(t)=(e_m^x(t)^2+e_m^y(t)^2+e_m^z(t)^2)$ and $e^{combined}(t)=(e^x(t)^2+e^y(t)^2+e^z(t)^2)$ to get a combined measure of error in all three directions.

In step 242, the values of the error metric are stored by the processor 202 for later analysis and use by a computer system.

Conclusion

Wavelets are useful for yielding a compact representation of cartographic data with improved accuracy, and for line generalization, and zooming. Furthermore, different wavelet bases can be applied to a cartographic database, once the initial wavelet formulation has been done. Moreover, the wavelet transform can be extended to two or more dimensions according to teachings disclosed herein. For instance, a two-dimensional wavelet representation of geographical information can be used to represent surfaces.

While specific embodiments of the present invention have been shown and described, it will be apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

What is claimed is:

1. A method for representing cartographic data in a computer-based system, comprising:
   providing a cartographic database containing a sequence of latitude and longitude data points indicating locations along a geographic feature, wherein the sequence of latitude and longitude data points provide a data point representation of the geographic feature;
   using the latitude and longitude data points to generate a parameterized function representing the geographic feature;
   computing a plurality of wavelet coefficients from said parameterized function representing the geographic feature, wherein said wavelet coefficients obtained with a wavelet, wherein said wavelet being one of a family of functions having a form $$\psi_{ab}(x) = |a|^{-1/2}\psi\left(\frac{x-b}{a}\right),$$

wherein $\psi_{ab}(x)$ is called a mother wavelet, a is called a dilation parameter, b is called a translation parameter, and x is an independent variable, wherein said computing the wavelet coefficients includes applying a wavelet transform to said parameterized function defined by the data points representing the geographic feature;
   assigning each of the computed wavelet coefficients to at least one of a plurality of display scales for a map display;
   indexing the wavelet coefficients by the assigned display scales for the map display; and
   after said step of computing, storing the wavelet coefficients in a computer-usable database on a physical storage medium to provide a wavelet-based representation of the geographic feature, wherein the wavelet-based representation has a smaller data size than the data point representation of the geographic feature.

2. The method of claim 1, wherein the data points include altitude.

3. The method of claim 1, wherein the geographic feature is the boundary of a feature selected from the group consisting of a road, waterway, building, park, lake, railroad track, and airport.

4. The method of claim 1, wherein the step of computing the wavelet coefficients includes:
   computing the wavelet coefficients by performing a least-squares fit.

5. The method of claim 1, wherein the wavelet coefficients are computed using a semi-discrete orthonormal wavelet transform.

6. A method of displaying on a computer output device a representation of a geographic feature, comprising:
   identifying a display scale for displaying the representation of the geographic feature, wherein the display scale is one of several display scale levels useable for a zooming operation of a map display;
   retrieving from a computer-usable database a plurality of wavelet coefficients associated with the geographic feature at the identified display scale, wherein a wavelet being one of a family of functions having a form $$\psi_{ab}(x) = |a|^{-1/2}\psi\left(\frac{x-b}{a}\right),$$

wherein $\psi_{ob}(x)$ is called a mother wavelet, a is called a dilation parameter, b is called a translation parameter, and x is an independent variable, the wavelet coefficients being derived from a plurality of latitude and longitude data points specifying geographic locations on the geographic feature, wherein the plurality of latitude and longitude data points provide a data point representation of the geographic feature, wherein the derived wavelet coefficients provide a wavelet-based representation of the geographic feature, wherein the wavelet-based representation has a smaller data size than the data point representation of the geographic feature, wherein each of the wavelet coefficients are assigned to at least one of the of display scale levels;
   generating a parameterized function representing the geographic feature at the display scale using the retrieved wavelet coefficients; and
   displaying a line on the computer output device corresponding to the parameterized function representing the geographic feature at the display scale.

7. The method of claim 6, further comprising:
   performing the zooming operation to display another representation of said geographic feature at a different scale level by retrieving the wavelet coefficients associated with the geographic feature at the different display scale.

8. The method of claim 6, wherein the geographic feature is selected from the group consisting of a road, waterway, building, park, lake, railroad track, and airport.

* * * * *